A. Y. DAVIS.
GRIP NUT.
APPLICATION FILED DEC. 9, 1911.
1,028,196.
Patented June 4, 1912.
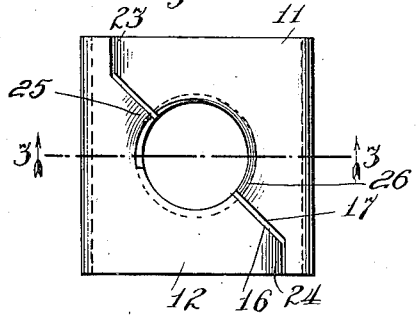
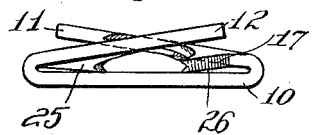
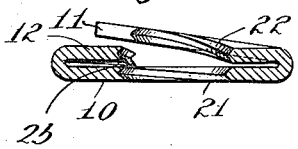
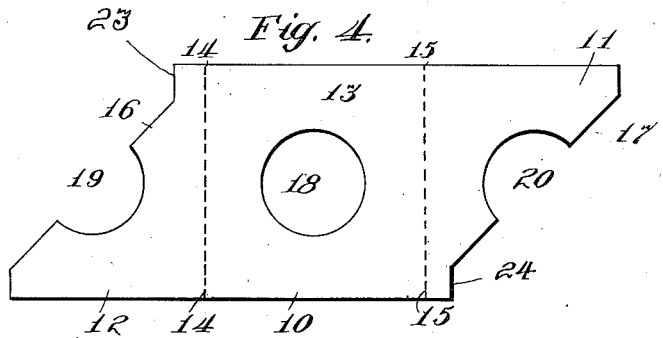
Witnesses
Milton Lenoir
Marie Tapy.
Inventor.
Alpha Y. Davis.
by Gillson & Gillson
Attorneys.

UNITED STATES PATENT OFFICE.

ALPHA Y. DAVIS, OF CHICAGO, ILLINOIS.

GRIP-NUT.

1,028,196.  Specification of Letters Patent.  Patented June 4, 1912.

Application filed December 9, 1911. Serial No. 664,725.

*To all whom it may concern:*

Be it known that I, ALPHA Y. DAVIS, a citizen of the United States, and resident of Chicago, county of Cook, and State of Illinois, have invented certain new and useful Improvements in Grip-Nuts, of which the following is a specification, and which are illustrated in the accompanying drawings, forming a part thereof.

The invention relates to nuts adapted to be run upon threaded bolts and to frictionally bind upon the threads of the bolt to prevent accidental removal of the nut.

The object of the invention is to provide a nut of the class described which shall be of simple and inexpensive construction and efficient in operation and which may be superimposed upon a holding nut for the purpose of preventing a dislodgment of the latter.

The invention is exemplified in the structure to be hereinafter described and illustrated in the accompanying drawings in which—

Figure 1 is a plan view of a grip nut embodying the features of improvement provided by the invention; Fig. 2 is a side elevation of the same; Fig. 3 is a sectional view taken on the broken line 3—3 of Fig. 1, and Fig. 4 is a plan view illustrating a blank of sheet metal from which the nut illustrated in Figs. 1, 2 and 3 may be formed.

The nut provided by the invention preferably comprises a base 10 and a pair of wings 11 and 12 which extend over the base from opposite sides, each of the wings being of such shape as to cover one-half of the base. Most desirably, the base 10 and wings 11 and 12 are all formed from sheet metal. As shown, these parts are formed integral as by folding the sheet metal blank illustrated at 13, Fig. 4, at the places indicated by the dotted lines 14—14 and 15—15.

The blank 13 is shown as being of substantially oblong rectangular shape with oppositely chamfered ends 16 and 17. To provide a bolt receiving aperture extending entirely through the completed nut, the blank 13 is centrally punched, as at 18, and the chamfered ends 16 and 17 are notched, as shown at 19 and 20. The two notches 19 and 20 together provide an opening between the wings 11 and 12 which registers with, and is of the same size as, the aperture 18 provided in that part of the blank which forms the base portion 10 of the nut. When the blank has been folded upon the lines 14—14 and 15—15, the aperture 18 and notches 19 and 20 are threaded to permit the nut to run upon a threaded bolt. Preferably the thickness of the blank 13 is such that only a single continuous thread, as 21, appears upon the side walls of the aperture 18 and only parts of a single continuous thread, as 22, appear upon each of the side walls of each of the notches 19 and 20.

In order that the nut may have a frictional grip upon the threads of the bolt, it is preferably made of elastic material and the wings 11 and 12 are so folded as to be inclined upwardly from the base 10 toward the free edges of the wings respectively, the threads, as 21 and 22 being formed when the wings 11 and 12 have been elastically depressed into parallel relation with the base 10. In applying the nut to a threaded bolt the base portion 10 of the nut is first presented to the bolt. In this position of the parts, the threads, as 22, formed upon the wings 11 and 12 will be more sharply inclined than are the threads of the bolt. When, however, the threads of the bolt come into engagement with the threads, as 22, formed upon the wings, the wings 11 and 12 will be elastically depressed by a cam action, thereby causing the threads of the nut to have a frictional grip upon the threads of the bolt. Owing to the spiral character of the thread, those parts formed upon the wings 11 and 12 will come in engagement with the threads successively, thereby causing the wings to be elastically depressed one at a time whereby the frictional resistance to the turning of the nut resulting from the depression of each wing, is duplicated by the depression of the other and the combined frictional resistance of the two wings is double that afforded by a single wing.

Most desirably the chamfered portions 16, 17 of the blank 13 do not extend entirely across the ends of the blank, whereby shoulders, as 23, 24 are formed beyond the lines of fold 14—14 and 15—15. By reference to Fig. 1 of the drawings it will be seen that these shoulders permit the application of a wrench to the side faces of the nut without danger of distorting the wings 11 and 12. In order that the pitch of those parts of the thread, as 22, formed in the wings 11 and 12 may be uniform, the greater portion of the wings is left sufficiently removed from the base 10 of the nut to permit those parts of the wings, as 25, 26, which receive the initial portion of the thread, to be pressed inwardly as appears in Fig. 2 of the drawings. The nut provided by the invention will most advantageously be used merely as a means for preventing the dislodgment of a nut of usual construction and will accordingly be superimposed upon such nut on the bolt. A plurality of blanks of the form shown at 13, Fig. 4, may be punched from a continuous bar of metal without waste of material other than that removed for the formation of the apertures 18 and notches 19, 20.

I claim as my invention—

1. A grip nut having a central threaded aperture extending through the same and comprising a base and an elastic wing extending over the base from one side thereof, said wing being normally inclined to the plane of the base and having a chamfered free end terminating upon a median axial plane of the nut which is oblique to the said side of the nut from which the wing extends whereby the said chamfered free end of the wing has a substantially semi-circular threaded notch constituting a part of the side wall of the nut aperture, the said wing having been elastically depressed into a plane parallel to the plane of the base during the threading of such aperture.

2. A grip nut having a central threaded aperture extending through the same and comprising a base and a pair of elastic wings extending over the base from opposite sides and being normally oppositely inclined to the plane of the base, the free edges of the wings being in juxtaposition upon a median axial plane of the nut, whereby each of said wings has a semi-circular threaded notch upon its free edge forming a part of the side wall of the nut aperture, the wings having been elastically deflected into a plane parallel to the plane of the base during the threading of such aperture.

3. A grip nut having a central threaded aperture extending through the same and comprising a base and a pair of elastic wings extending over the base from opposite sides and being normally oppositely inclined to the plane of the base, the ends of the wings being oppositely chamfered and such chamfered edges being in juxtaposition upon a median axial plane of the nut whereby each of said wings has upon its said chamfered edge a semi-circular threaded notch constituting a part of the wall of the threaded aperture of the nut, the said wings having been elastically deflected into a plane parallel to the plane of the base during the threading of such aperture.

4. A grip nut having a central threaded aperture extending through the same and comprising a base and a pair of wings extending over the base from opposite sides, the said base and wings being formed integral from the intermediate and end portions respectively of a spring metal plate folded upon parallel transverse lines, the said wings being each inclined away from the plane of the base toward its free edge and the said free edges of the wings being oppositely chamfered and in juxtaposition upon a median axial plane of the nut whereby said chamfered edges each have a substantially semi-circular threaded notch constituting a part of the side wall of the nut aperture, the said wings having each been elastically depressed into a plane parallel to the plane of the base during the threading of such aperture.

5. A grip nut having a central threaded aperture extending through the same and comprising a base and a wing extending over the base from one side thereof, the said base and wing being formed integral from a spring metal plate folded upon a transverse line, the said wing being inclined away from the plane of the base toward its free edge and the said free edge of the wing being chamfered and terminating upon a median axial plane of the nut whereby the said chamfered edge has a substantially semi-circular threaded notch constituting a part of the side wall of the nut aperture, the said wing having been elastically depressed into a plane parallel to the plane of the base during the threading of such aperture.

ALPHA Y. DAVIS.

Witnesses:
 CHARLES B. GILLSON,
 MARIE TAPY.